United States Patent
Werjefelt et al.

(10) Patent No.: US 12,097,964 B2
(45) Date of Patent: Sep. 24, 2024

(54) EMERGENCY VISION SYSTEM WITH FIXED AND HAND-HELD ENCLOSURES

(71) Applicants: Bertil Werjefelt, Kaneohe, HI (US); Alexander Werjefelt, Kamuela, HI (US)

(72) Inventors: Bertil Werjefelt, Kaneohe, HI (US); Alexander Werjefelt, Kamuela, HI (US)

(73) Assignee: VISIONSAFE, LLC, Kaneohe, HI (US)

( * ) Notice: Subject to any disclaimer, the term of this patent is extended or adjusted under 35 U.S.C. 154(b) by 250 days.

(21) Appl. No.: 16/517,119

(22) Filed: Jul. 19, 2019

(65) Prior Publication Data

US 2020/0023979 A1 Jan. 23, 2020

Related U.S. Application Data

(60) Provisional application No. 62/768,539, filed on Nov. 16, 2018, provisional application No. 62/702,110, filed on Jul. 23, 2018.

(51) Int. Cl.
*B64D 25/00* (2006.01)

(52) U.S. Cl.
CPC .......... *B64D 25/00* (2013.01); *B64D 2201/00* (2013.01)

(58) Field of Classification Search
CPC .... B64D 25/00; B64D 2201/00; B64D 43/00; B64D 45/00; B64D 2231/00; G02B 27/02; B64C 1/1476
See application file for complete search history.

(56) References Cited

U.S. PATENT DOCUMENTS

| D372,825 | S | * | 8/1996 | Hood | ............................. D6/559 |
| 8,453,969 | B2 | | 6/2013 | Werjefelt | |
| 2005/0257578 | A1 | | 11/2005 | Gnadinger | |
| 2017/0235149 | A1 | | 8/2017 | Werjefelt | |

OTHER PUBLICATIONS

Notification of Transmittal of the International Search Report and the Written Opinion of the International Searching Authority, or the Declaration for PCT/US19/42636.
Visionsafe Corporation "EVAS = Emergency Vision Assurance System" VisionSafe Corporation, manufacturer of EVAS Manual Jun. 18, 2009.

* cited by examiner

*Primary Examiner* — Benjamin P Lee
(74) *Attorney, Agent, or Firm* — FRESH IP PLC (57) ABSTRACT

An emergency vision system includes a housing; an inflatable main enclosure having an inflated state and a deflated state, the main enclosure in the deflated state is disposed in the housing, the main enclosure in the inflated state is configured to be stationarily disposed between a user and a source of information required to be seen by the user during a smoke emergency; and a movable hand-held enclosure having an inflated state and a deflated state, the hand-held enclosure in the deflated state is disposed in the housing, the hand-held enclosure in the inflated state is configured to be used by the user to view a second source of information not visible through the main inflatable enclosure.

22 Claims, 12 Drawing Sheets

EMERGENCY VISION SYSTEM WITH FIXED AND HAND-HELD ENCLOSURES

FIELD OF THE INVENTION

The present invention is generally directed to a system to enable an operator to maintain visual contact with instruments or other visual sources of data after smoke and/or particulate from a fire or other sources has invaded the operator's environment. In particular, the present invention relates to a system with fixed and hand-held enclosures that provides a clear view outside an aircraft cockpit and of the instrument panel, relevant checklist, approach plate, keyboard, circuit breakers, fuses, control panel, etc., thereby providing a pilot with vital information for guiding the aircraft to a safe landing after smoke and/or particulate matter invades the cockpit area.

BACKGROUND OF THE INVENTION

When cockpits are invaded by continuous, dense, blinding smoke that turn airplanes into unguided missiles, the results are well known to be catastrophic and fatal for passengers and crew. None creates an unsafe condition faster than a pilot blinded by continuous, opaque smoke. And none occurs as frequently as smoke in the cockpit. According to the Air Line Pilots Association, airliners make an unscheduled or emergency landing due to smoke in the cockpit on an average of once per day.

What is true for a cockpit is equally true for any operator station where the operator's ability to see the instrument panel when smoke invades the operator's station depends on the safe operation or orderly shutdown of critical processes, such as occur in a nuclear power station, submarine and similar operator stations.

SUMMARY OF THE INVENTION

The present invention provides an emergency vision system, comprising a housing; an inflatable main enclosure having an inflated state and a deflated state, the main enclosure in the deflated state is disposed in the housing, the main enclosure in the inflated state is configured to be stationarily disposed between a user and a source of information required to be seen by the user during a smoke emergency; and a movable hand-held enclosure having an inflated state and a deflated state, the hand-held enclosure in the deflated state is disposed in the housing, the hand-held enclosure in the inflated state is configured to be used by the user to view a second source of information not visible through the main inflatable enclosure.

DETAILED DESCRIPTION OF THE INVENTION

Figure 1:
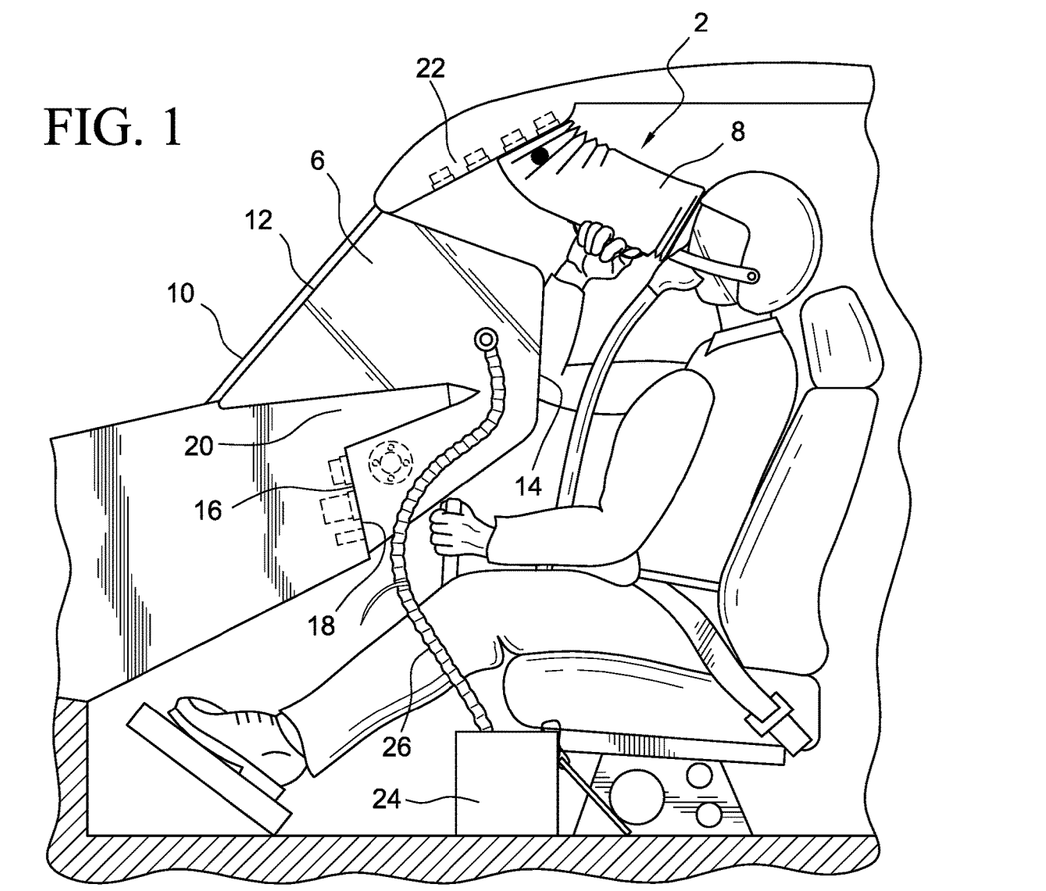
FIG. 1 is a side elevational view of a cockpit, showing an emergency vision system comprising a main enclosure and a hand-held enclosure in use during a smoke emergency.

Referring to FIG. 1, an emergency vision system 2 embodying the present invention is disclosed. The system 2 includes an inflatable enclosure 6 and an inflatable hand-held enclosure 8. The enclosures 6 and 8 are shown in their deployed, inflated state. The enclosure 6 is well known in the art, as disclosed, for example, in U.S. Pat. No. 5,947,415, herein incorporated by reference. The hand-held enclosure 8 is disclosed in application Ser. No. 15/390,299, herein incorporated by reference. The enclosure 8 is disclosed only for illustration purposes and is not limited to what is specifically shown as it can take on several embodiments, as disclosed, for example, in the Ser. No. 15/390,299 application; Provisional Application Ser. No. 62/568,043, filed on Oct. 4, 2017; U.S. Pat. Nos. 6,460,804; 7,583,455; 9,193,477; 8,213,101 and 9,329,393, all of which are hereby incorporated by reference. The enclosure 8 in whatever embodiment must be capable of being compacted and reduced into a smaller size to fit inside a housing for stowage, as will be discussed below, when not in use.

The enclosure 6 allows the pilot to see outside the cockpit through the windshield 10 via clear members 12 and 14 and view the instrument panel 16 via a clear members 18 and the clear member 14 during a smoke emergency when normal visibility within the cockpit is substantially impaired. The enclosure 6 is removably fixed (stationary) to the glare shield 20 once it is inflated and positioned against the windshield 10 and the instrument panel 16. In order to see other areas in the cockpit not encompassed by the enclosure 6, the hand-held enclosure 8 is used, allowing the user to view other areas of the cockpits, such as the overhead panel 22. Since the hand-held enclosure 8 is movable, it can be readily repositioned to view any other area within the cockpit within reach.

Figure 2:
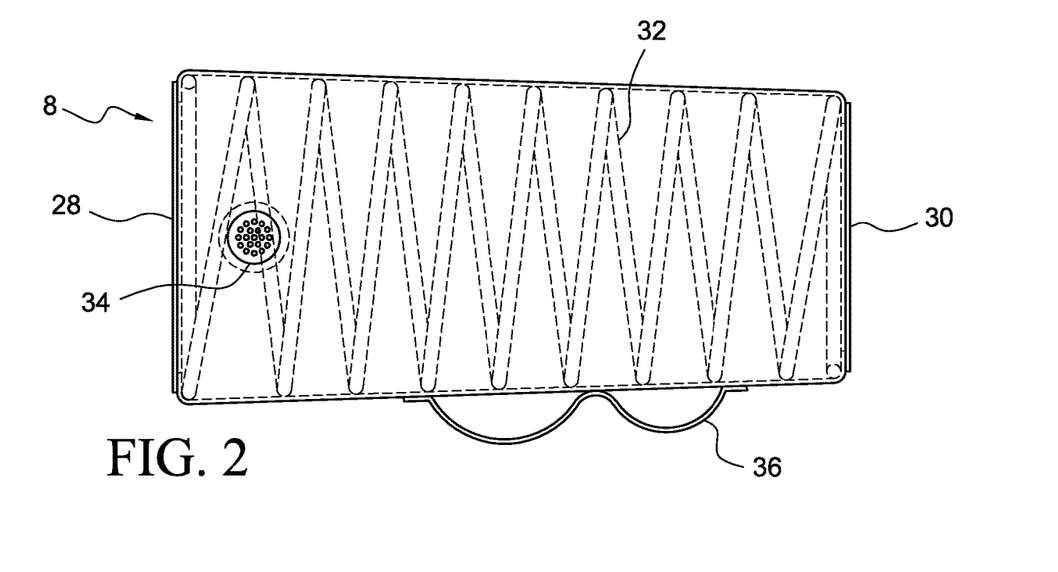
FIG. 2 is a side elevational view of the hand-held enclosure of FIG. 1.
Figures 3, 4, 5:
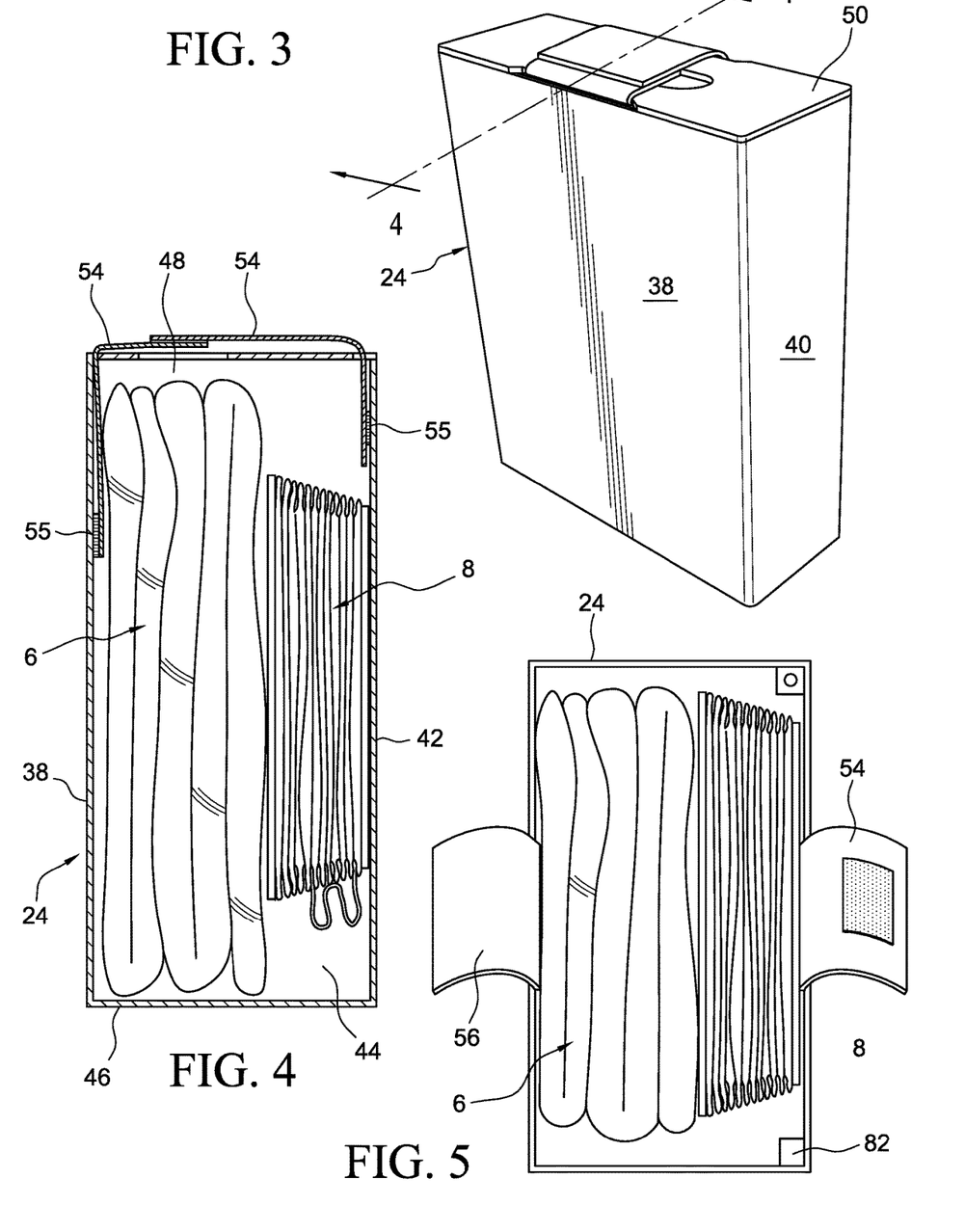
FIG. 3 is perspective view of the system of FIG. 1 when deflated and stowed in a housing.
FIG. 4 is cross-section view along line 4-4 of FIG. 3, showing the deflated enclosures inside the housing.
FIG. 5 is top view of FIG. 4 with the cover removed, showing the main enclosure and the hand-held enclosure as viewed by a user.
Figure 6:
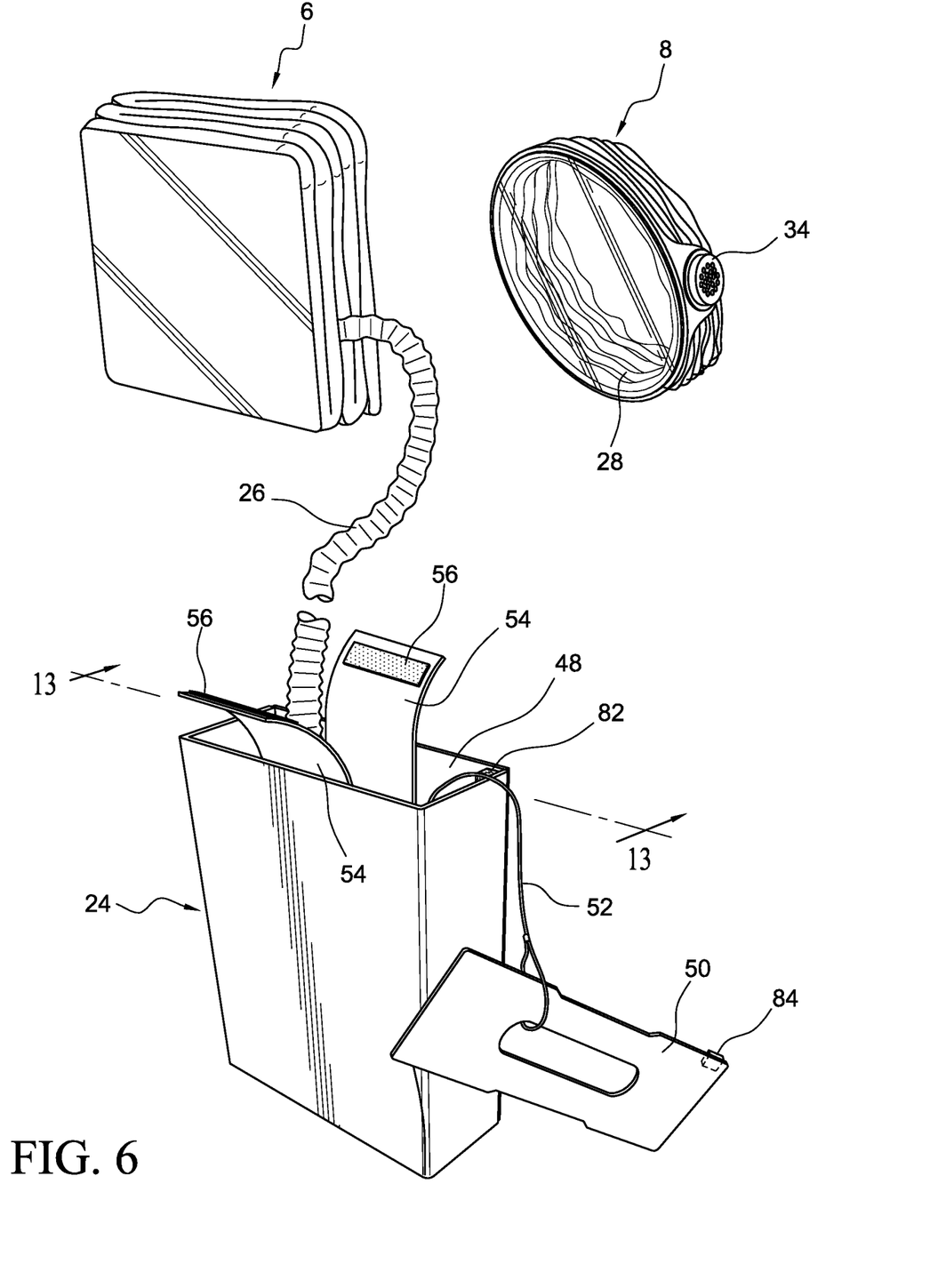
FIG. 6 is a perspective of the system showing the main enclosure and the hand-held enclosure outside the housing prior to being inflated.
Figure 7:
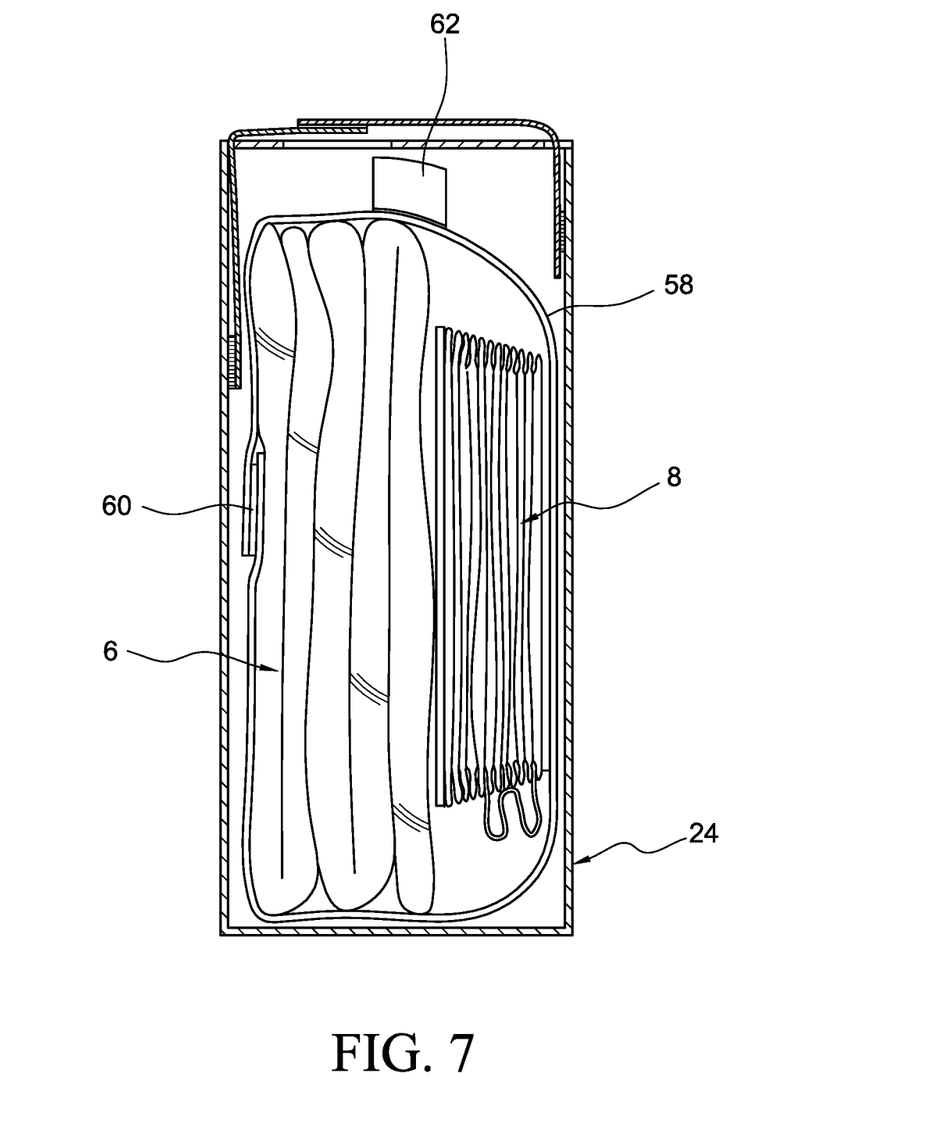
FIG. 7 is a cross-sectional view similar to FIG. 4, showing a wrapper around the enclosures.
Figures 8, 9:
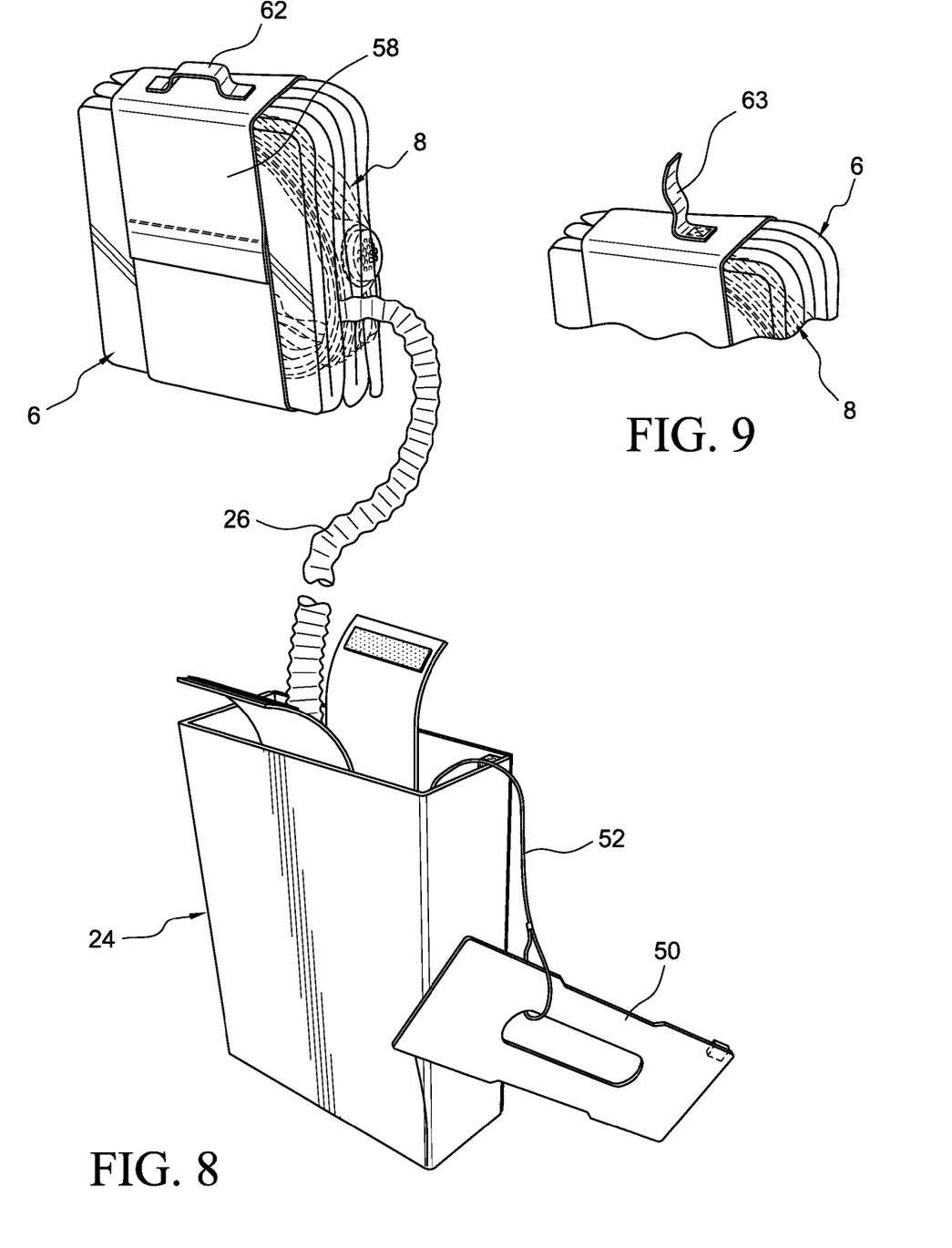
FIG. 8 is a perspective of the system of FIG. 7, showing the main enclosure and the hand-held enclosure outside the housing prior to being inflated.
FIG. 9 is a fragmentary perspective view of the system showing a pull tab.

The system 2 includes a housing 24 for storing the enclosures 6 and 8 when deflated and not in use. The housing 24 includes a blower and a filter for inflating the enclosure 6 with the ambient air after being filtered of vision obscuring particulate matter generated by a smoke or fire event. Batteries for powering the blower are inside the housing 24. A hose 26 connects the blower to the interior of the enclosure 6. Referring to FIG. 2, the enclosure 8 includes clear members 28 and 30 that allows the user to see through the enclosure. The enclosure 8 is tubular, preferably cylindrical or conical, inflatable by a spring 32 that expands axially to draw the ambient air through a filter 34. A strap 36 is attached to the wall of the enclosure 8 to serve as a handle. The spring 32 is shown as helical but it should be understood that other forms of spring or support can be used, such as, for example, the spring wire disclosed in the 62/568,043 application.

Referring to FIGS. 3-6, the housing 24 is box-shaped with planar walls 38-46. The walls 38 and 42 are preferably parallel. The walls 40 and 44 are preferably parallel. The housing 24 has a top opening 48 closed off by a removable cover 50. A lanyard 52 is attached to the cover 50 and the housing 24 to keep the cover from being misplaced when the housing is opened. Straps 54 with fasteners 56, such as VELCRO fasteners. The straps 54 are attached to the inside surfaces of the respective walls 38 and 42 with fasteners 55, such as VELCRO fasteners.

The enclosures 6 and 8 in the deflated state are stored inside the housing 24 in a parallel "open palm-to-open palm or face-to-face" configuration with the enclosure 6 adjacent one of the walls 38 and 42 and the enclosure 8 adjacent the other of the walls 38 and 42. In this configuration, both of the enclosures 6 and 8 are advantageously visible to the user for retrieval when the cover 50 is removed in the process of deploying the enclosures and one of the enclosures 6 and 8 can be pulled out past the other one without the other one being removed first. By both enclosures 6 and 8 being visible to the user at the same time and stowed "open palm-to-open palm or face-to face," the user can advantageously decide to retrieve both enclosures at the same time or only the enclosure 6 without first taking the enclosure 8 out of the housing 24.

Referring to FIGS. 6-9, the enclosures 6 and 8 are joined together with a wrapper 58 joined together with a fastener 60, such as a VELCRO fastener. The wrapper 58 may be made of any suitable material, such as fabric. A handle 62 or a pull tab 63 is attached to the wrapper 58 for convenient retrieval of the enclosures 6 and 8 out of the housing 24. By joining the enclosures 6 and 8 together, both can be take out of the housing 24 at the same time.

Figure 10:
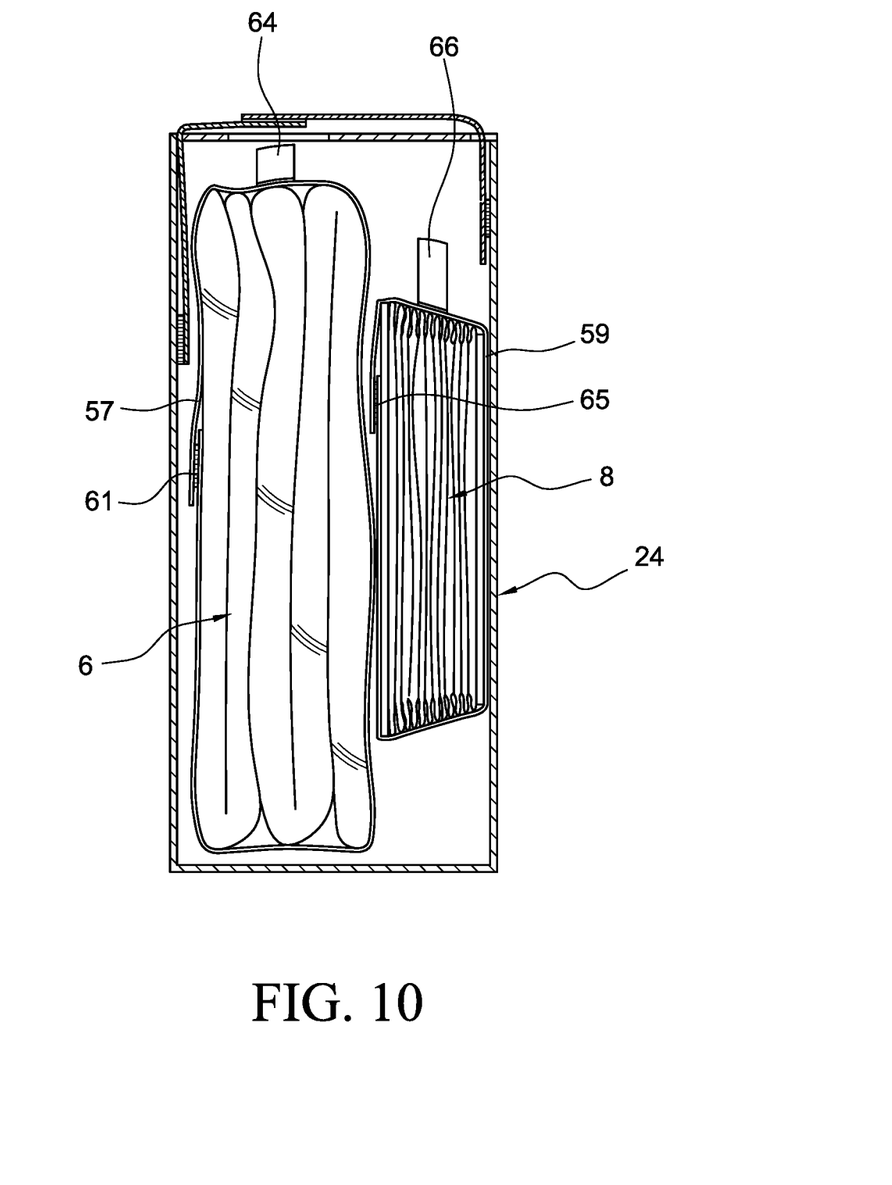
FIG. 10 is a cross-sectional similar to FIG. 4, showing a handle attached to each of the enclosures.
Figure 11:
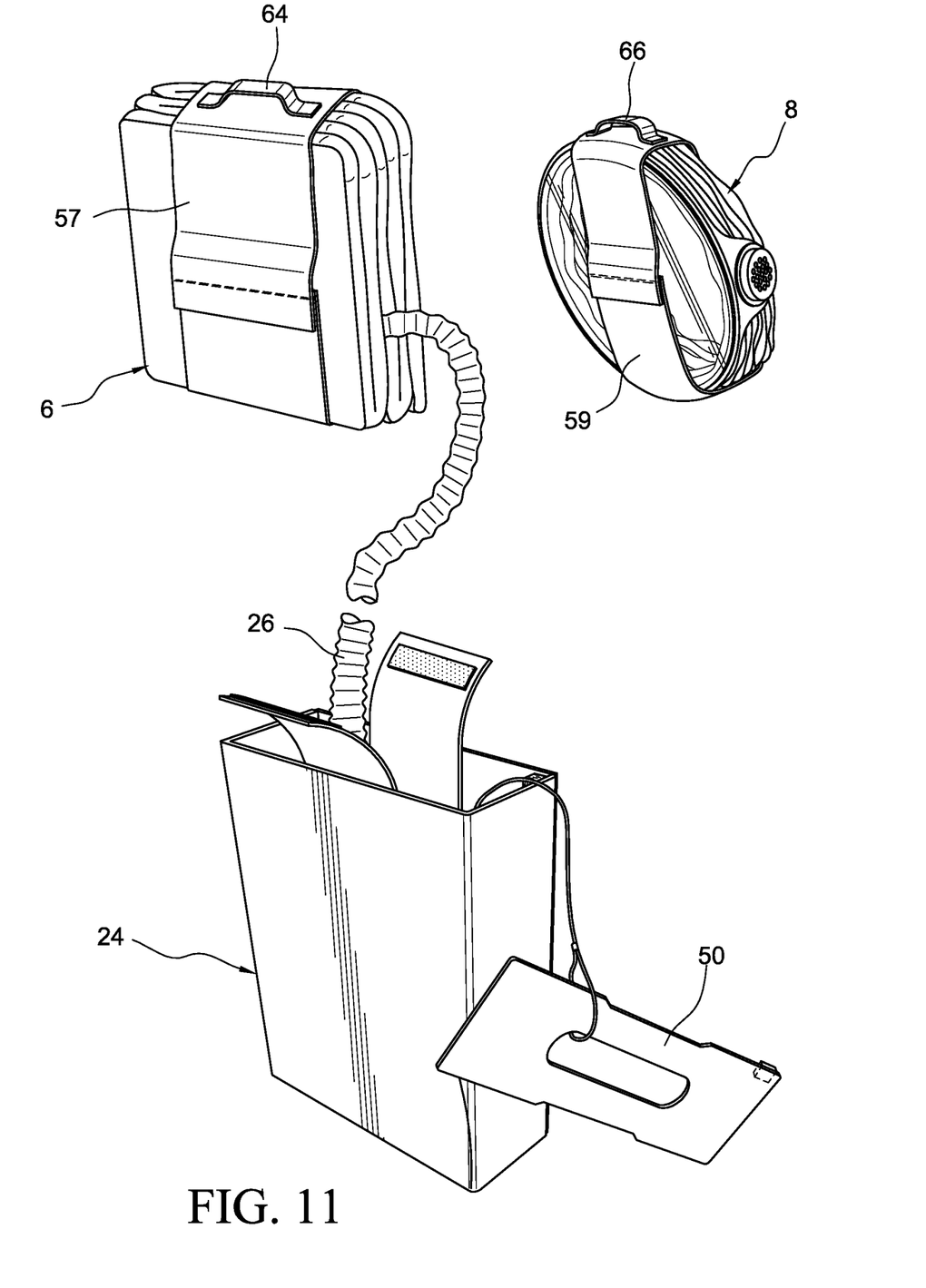
FIG. 11 is a perspective of the system of FIG. 10, showing the main enclosure and the hand-held enclosure outside the housing prior to being inflated.
Figure 12:
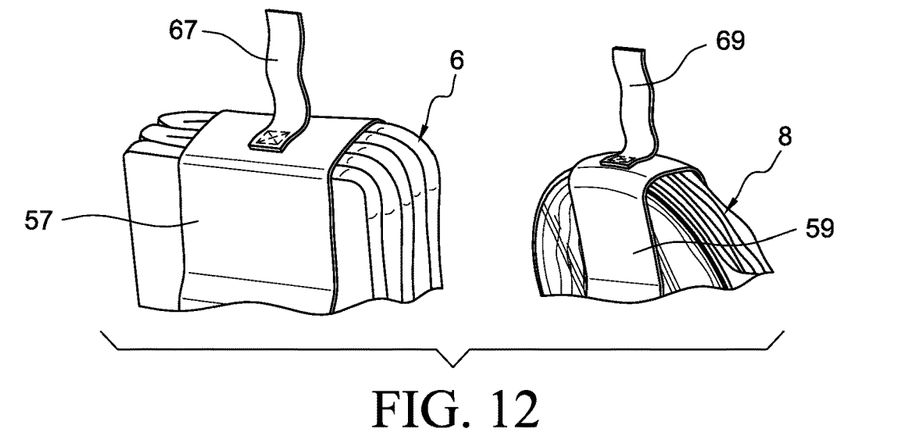
FIG. 12 is a fragmentary perspective view of the enclosures with respective pull tabs.

Referring to FIGS. 10-12, retainer straps 57 and 59 disposed around the respective enclosures 6 and 8 keep the enclosures folded in the deflated state for storage. The ends of the retainer straps 57 and 59 are secured by fasteners 61 and 65, such as VELCRO fasteners. Handles 64 and 66 are attached to the respective retainer straps 57 and 59. Alternatively, pull tabs 67 and 69 may be provided. The provision of the handles 64, 66 or the pull tabs 67, 69 advantageously allows the user with a positively identified items to pull when taking the enclosures out of the housing 24. The handles 64, 66 or the pull tabs 67 and 69 may be attached directly to the respective enclosures 6 and 8.

Figure 13:
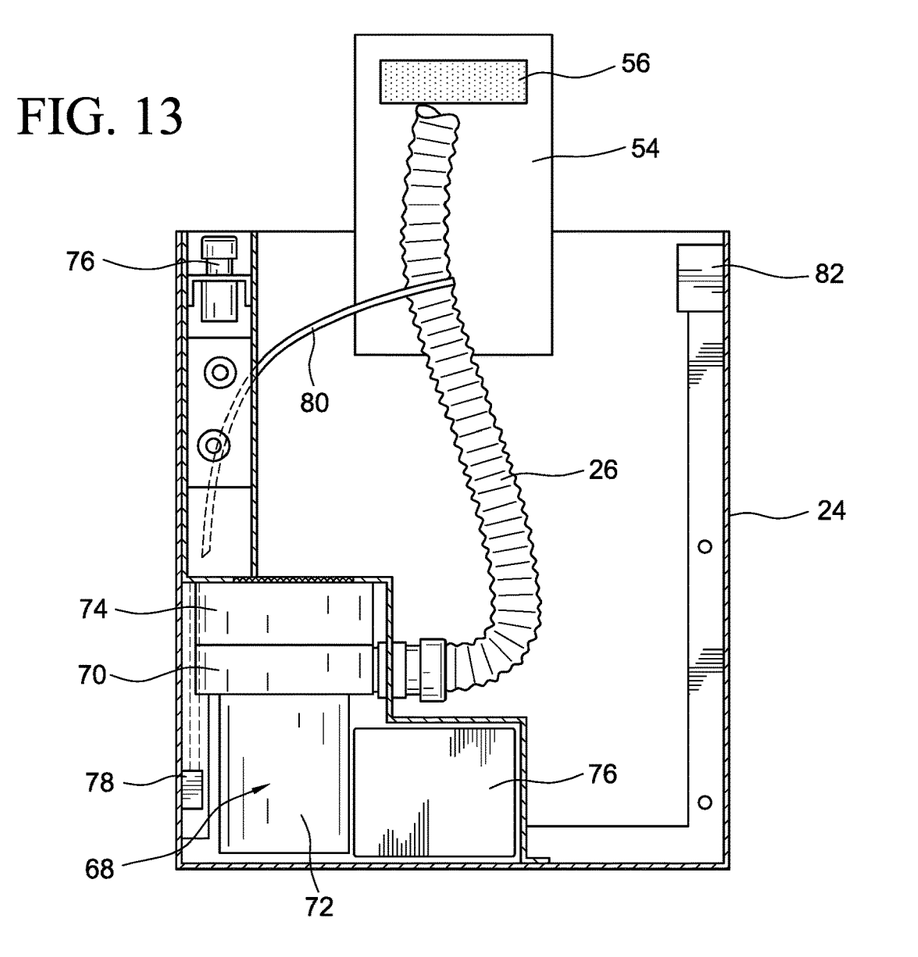
FIG. 13 is a cross-sectional view of the housing, showing a blower for inflating the main enclosure.

Referring to FIG. 13, a blower 68 with a blower fan 70 attached to a motor 72 draws the ambient air through a filter 74 to inflate the enclosure 6 during deployment. A battery 76 provides power to the blower motor 72. A main switch 76 controls the blower 68. Another switch 78 automatically turns on the blower 68 when a member 80 is withdrawn from the switch 78 when the enclosure 6 is removed from the housing 24, since the member 80 is attached to the hose 26. The switches 76 and 78 are connected electrically in series to one another so that power has to flow through both of the switches to power the blower 68; however, the switch 76 is normally on so that when the switch 78 is activated by the removal of the member 80, power will flow to the blower 68.

An alternative to the switch 78 is a magnetic switch 82 whose contacts are normally open when a magnetic field is applied by a magnet 84 and closed when the magnet 84 is moved away. The magnet 84 must be close enough so that its magnetic field is effective to keep the contacts of the switch open. When the cover 50 is attached to the housing 24 to close the opening 48, the magnet 84 causes the switch 82 to open. When the cover 50 is removed, the magnet 84 is separated from the switch 82, thereby closing the switch. The switch 82 may be positioned anywhere along the edge of the opening 48 where it will not interfere with the operation of the straps 54 in securing the cover 50 to the opening 48. The magnet 84 will also have to be moved to be near the switch 82, preferably to the side or above the switch 82 so that its magnetic field is effective to keep the contacts of the switch in the open position.

The switch 78 or 82 advantageously provides an automatic way of activating the blower 68 to save the time of manually turning on a switch. The enclosure 6 starts inflating as soon as the switch 78 or 82 is activated by withdrawing the enclosure out of the housing 24 or removing the cover, respectively.

Figure 14:
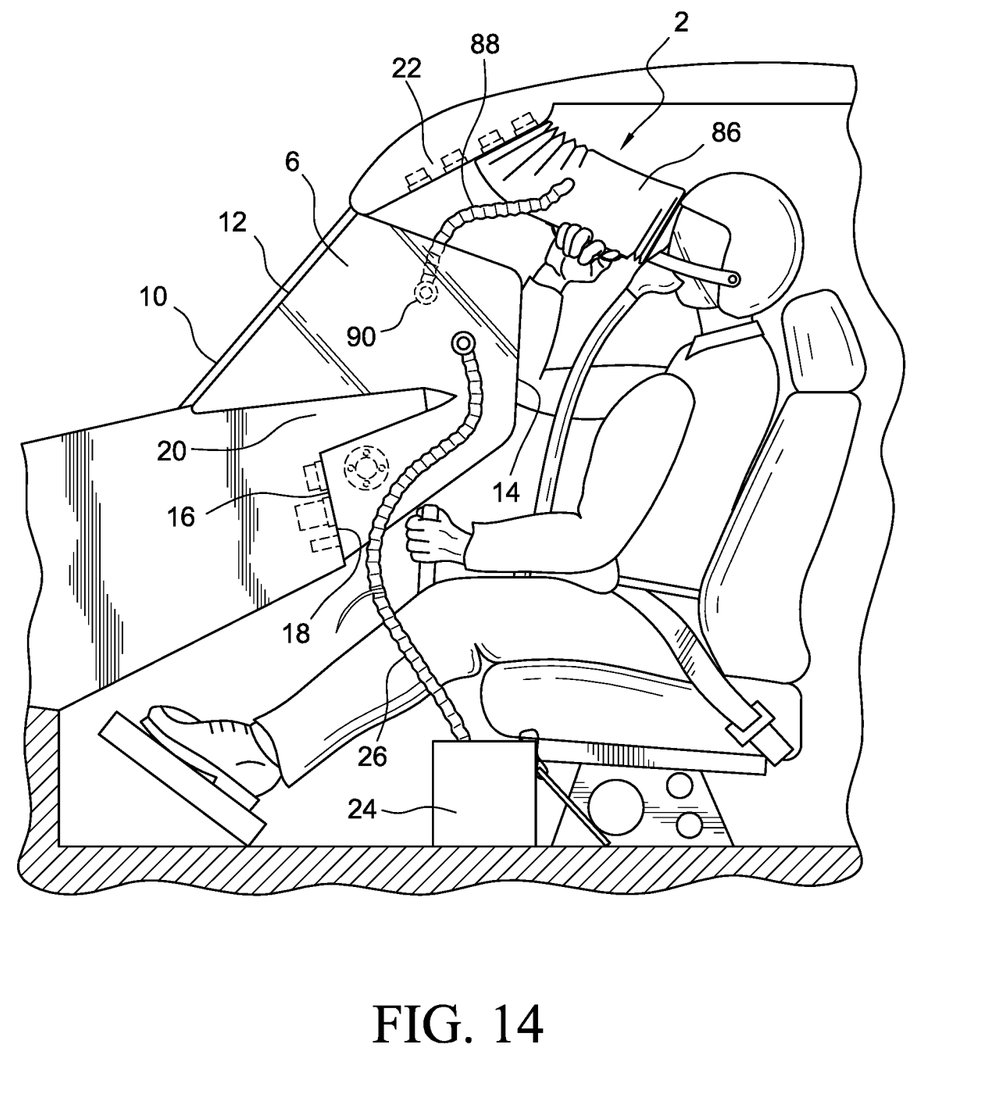
FIG. 14 is a side elevational view of a cockpit, showing a hand-held enclosure that gets its inflation air from the main enclosure during use.

Referring to FIG. 14, a hand-held inflatable enclosure 86 that gets its inflation air from the enclosure 6 during use is disclosed. The enclosure 86 is similar to the enclosure 8 but without the spring 32. A hose 88 is operably connected between the enclosures 6 and 86 to allow air from the enclosure 6 to flow to the enclosure 86 for inflation. The hose 88 is sufficiently long to allow the user to move the enclosure 86 to areas within the cockpit to enable the user to view information to assist the user to operate the aircraft. The hose 88 may be removably connected to the enclosure at a connector 90. The enclosure 86 may remain deflated in the housing 24 while the enclosure 6 is deployed. When the need arises for the enclosure 86, it is inflated by connecting the hose to the connector 90 on the enclosure 6.

Figure 15:
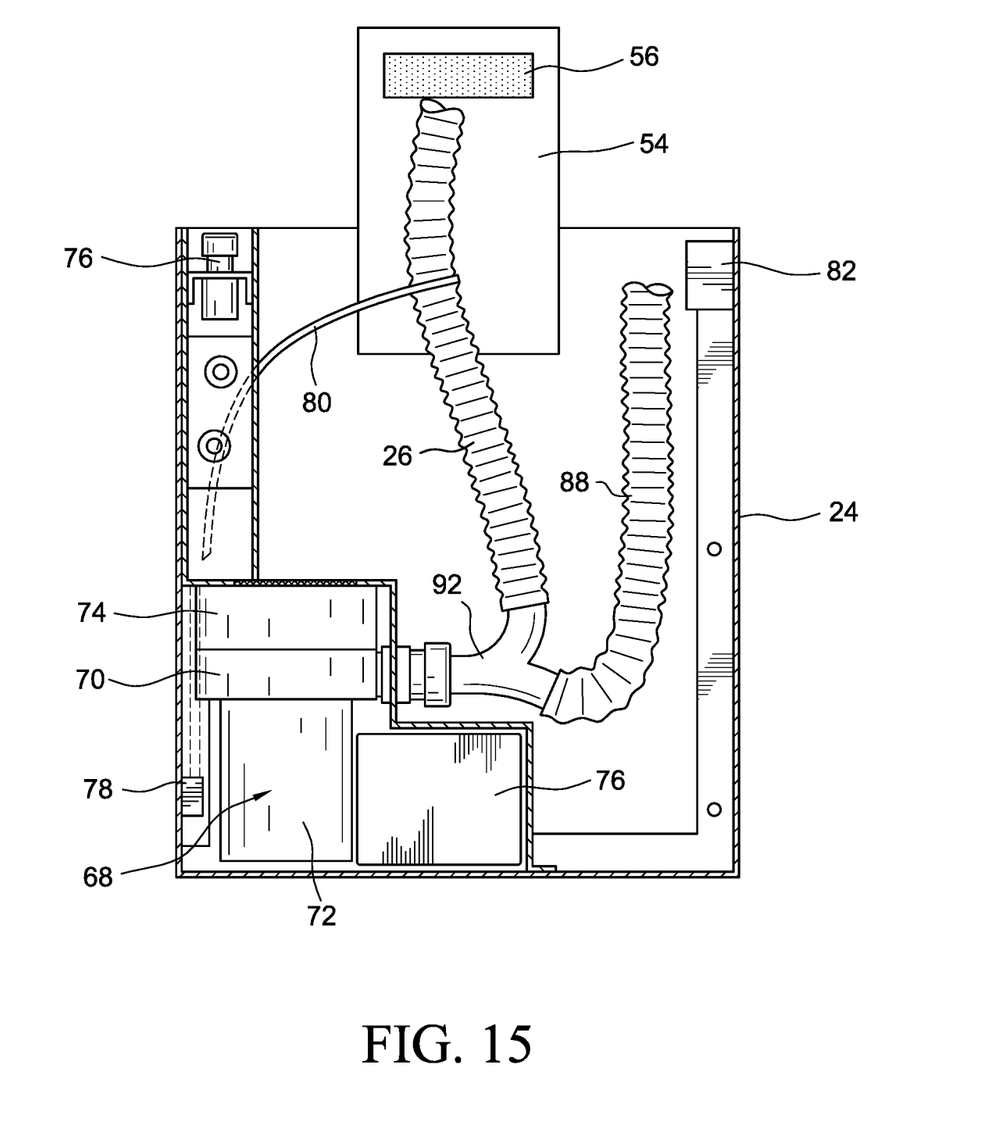
FIG. 15 is a cross-sectional view of the housing, showing a blower with a Y-connector for inflating the main enclosure and the hand-held enclosure.

Referring to FIG. 15, the hose 88 may also be connected directly to the blower 68 via a Y-connector 92 or any other standard connector. In this manner, the act of connecting the hose to the enclosure 6 is advantageously eliminated, saving valuable time during an emergency. The enclosure 86 inflates fully when taken out of the housing 24 and the retainer strap 59, if used.

Figures 16, 17:
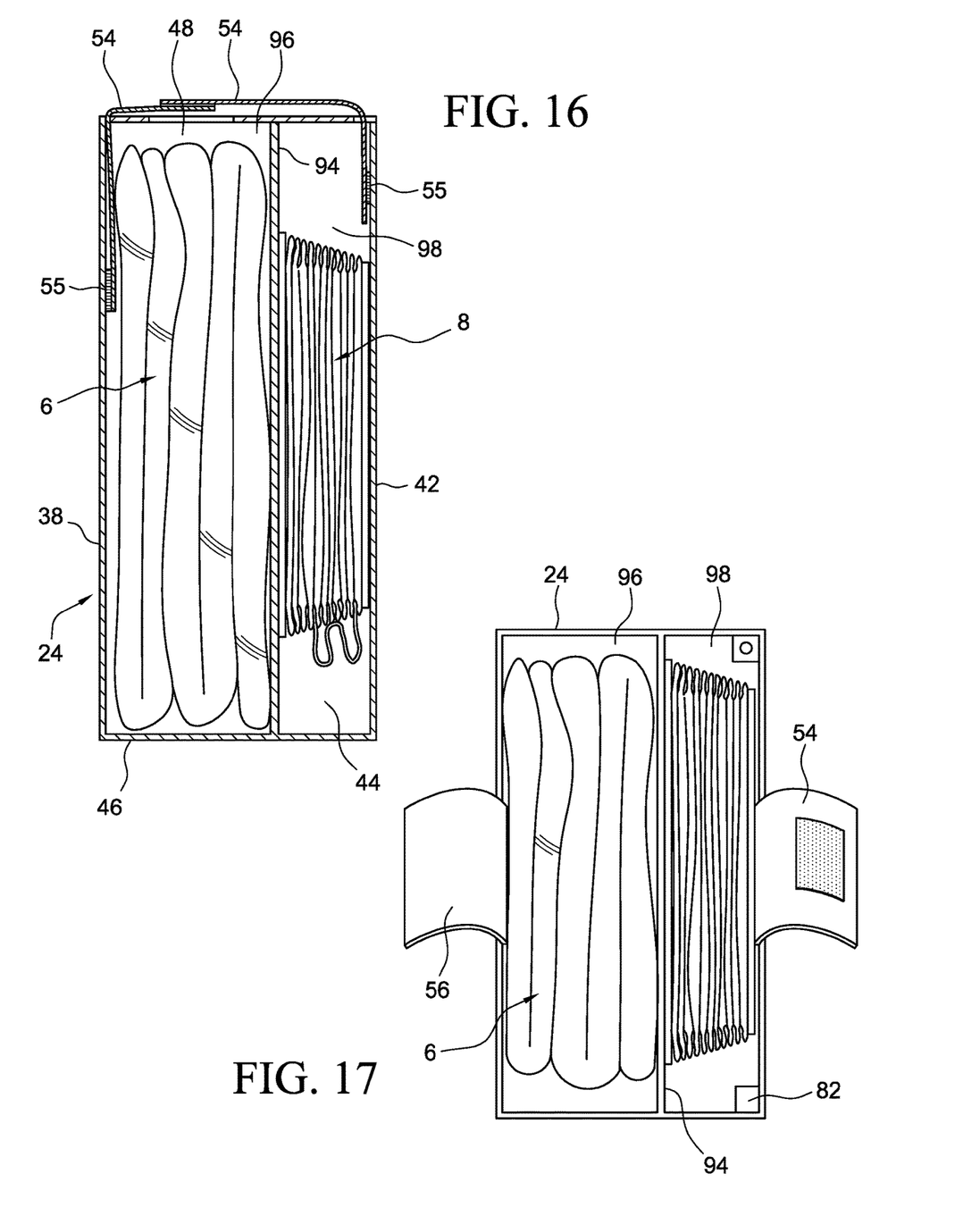
FIG. 16 is a cross-section similar to FIG. 4, showing the housing with a divider wall.
FIG. 17 is a top view of FIG. 16 with the cover removed, showing the main enclosure and the hand-held enclosure as viewed by a user.
Figure 18:
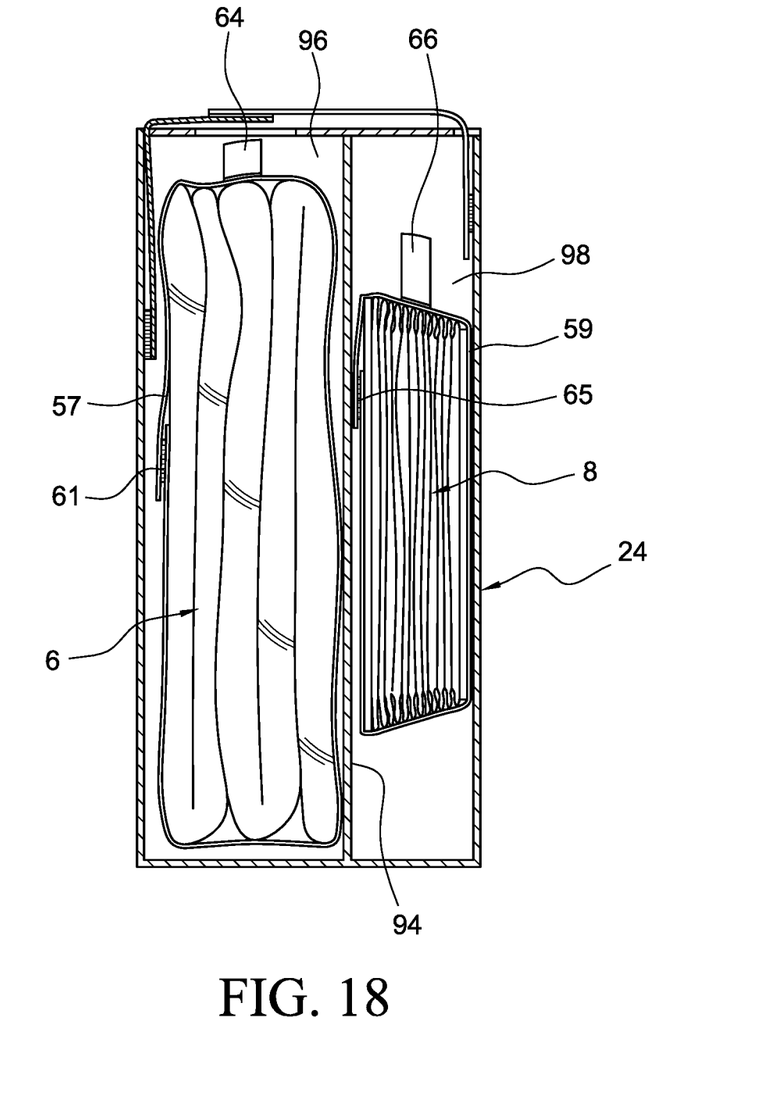
FIG. 18 is a cross-section similar to FIG. 10, showing the housing with a divider wall.

Referring to FIGS. 16-18, the housing 24 may include a divider wall 94 to advantageously provide individual compartments 96 and 98 for the enclosure 6 and the hand-held enclosure 8, 86. With separation provided by the wall 94, the hose 88, when the embodiment of the hand-held enclosure requires it for inflation, is contained within its own space, avoiding any entanglement with the hose 26. Where the hose 88 is directly connected to the blower 68, one end of the Y-connector 92 may extend through the wall 94 to connect to the hose 88 inside the compartment 96.

Although the present invention has been described in the environment of an aircraft cockpit, it should be understood that it would be equally applicable to other settings, such as in a submarine control station, a nuclear power plant control room or any other environments where the need exists for an operator to continue to operate in case of smoke in the room that obliterates the visibility between the operator and the control panel. For example, in FIG. 1, the instrument or control panel 16 may be disposed in an operator station within a control room in a submarine, nuclear power plant, or other critical areas. In this case, to continue to operate, the operator must have visual access to the instrument or control panel in case smoke invades the operator station.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

We claim:

1. An emergency vision system, comprising:
   a) a box-shaped housing;
   b) an inflatable main enclosure having an inflated state and a deflated state, the main enclosure in the deflated state is disposed in the box-shaped housing, the main enclosure in the inflated state is configured to be stationarily disposed between a user and a source of information required to be seen by the user during a smoke emergency;
   c) a movable hand-held enclosure having an inflated state and a deflated state, the hand-held enclosure in the deflated state is disposed in the box-shaped housing, the hand-held enclosure in the inflated state is configured to be used by the user to view a second source of information not visible through the main inflatable enclosure; and
   d) the box-shaped housing including an opening; and
   e) the main enclosure and the hand-held enclosure are accessible through the opening.

2. The emergency vision system as in claim 1, wherein the main enclosure and the hand-held enclosure are disposed parallel to each other inside the housing.

3. The emergency vision system as in claim 1, wherein the main enclosure is removable from the housing independently of the hand-held enclosure.

4. The emergency vision system as in claim 1, wherein the hand-held enclosure is removable from the housing independently of the main enclosure.

5. The emergency vision system as in claim 1, wherein:
   a) the housing includes opposing first and second walls;
   b) the main enclosure is disposed inside the housing adjacent the first wall; and
   c) the hand-held enclosure is disposed inside the housing adjacent the second wall.

6. The emergency vision system as in claim 5, wherein the first and second opposing walls are parallel.

7. The emergency vision system as in claim 1, wherein the opening encompasses one side of the housing.

8. The emergency vision system as in claim 1, and further comprising a removable wrapper disposed around the main enclosure and the hand-held enclosure.

9. The emergency vision system as in claim 8, and further comprising a pull tab or handle attached to the wrapper.

10. The emergency vision system as in claim 1, wherein:
    a) a first retainer strap is disposed around the main enclosure; and
    b) a second retainer strap is disposed around the hand-held enclosure.

11. The emergency vision system as in claim 1, and further comprising a blower for inflating the main enclosure.

12. The emergency vision system as in claim 11, and further comprising a switch for automatically activating the blower when the main enclosure is deployed.

13. The emergency vision system as in claim 12, wherein the switch is turned on when the main enclosure is taken out of the housing.

14. The emergency vision system as in claim 13, wherein:
    a) the switch includes a removable member operably attached to the main enclosure; and
    b) the switch is turned on when the member is removed.

15. The emergency vision system as in claim 12, wherein:
    a) the opening includes a cover; and
    b) the switch is turned on when the cover is removed.

16. The emergency vision system as in claim 15, wherein the switch includes a magnetic switch.

17. The emergency vision system as in claim 16, wherein the switch is disposed along an edge of the opening.

18. The emergency vision system as in claim 1, wherein the housing includes a divider wall to provide first and second separate compartments for the main enclosure and the hand-held enclosure, respectively.

19. The emergency vision system as in claim 1, wherein the hand-held enclosure includes a hose removably connected to the main enclosure.

20. The emergency vision system as in claim 1, wherein the hand-held enclosure includes a hose operably connected to a blower disposed in the housing.

21. The emergency vision system as in claim 1, wherein the hand-held enclosure includes a spring for inflation.

22. The emergency vision system as in claim 1, wherein the hand-held enclosure is tubular.

* * * * *